July 21, 1936.  C. W. BAILEY  2,048,589
COUNTER MOLDING MACHINE
Filed May 15, 1934  3 Sheets-Sheet 1

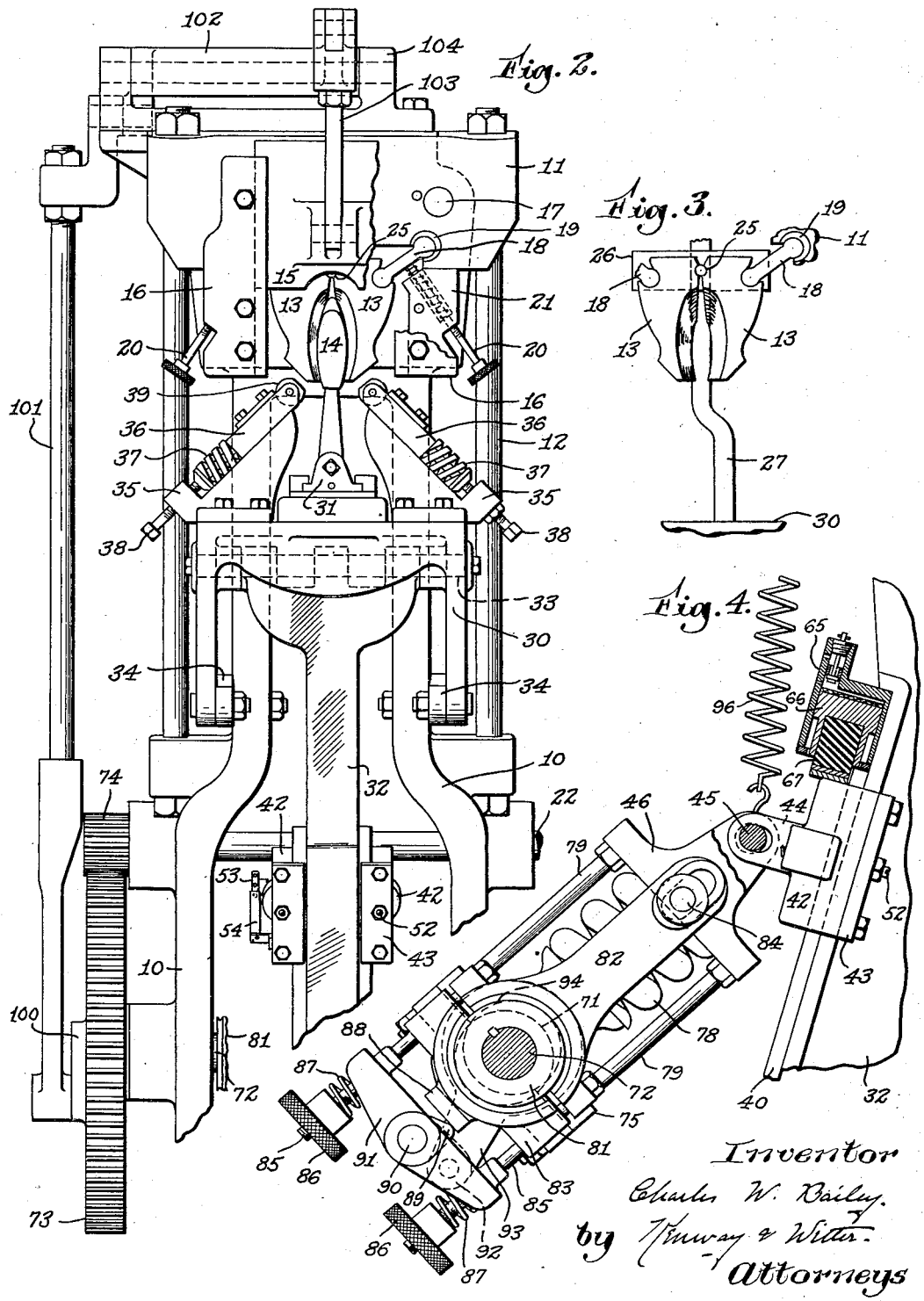

July 21, 1936.  C. W. BAILEY  2,048,589
COUNTER MOLDING MACHINE
Filed May 15, 1934  3 Sheets-Sheet 3
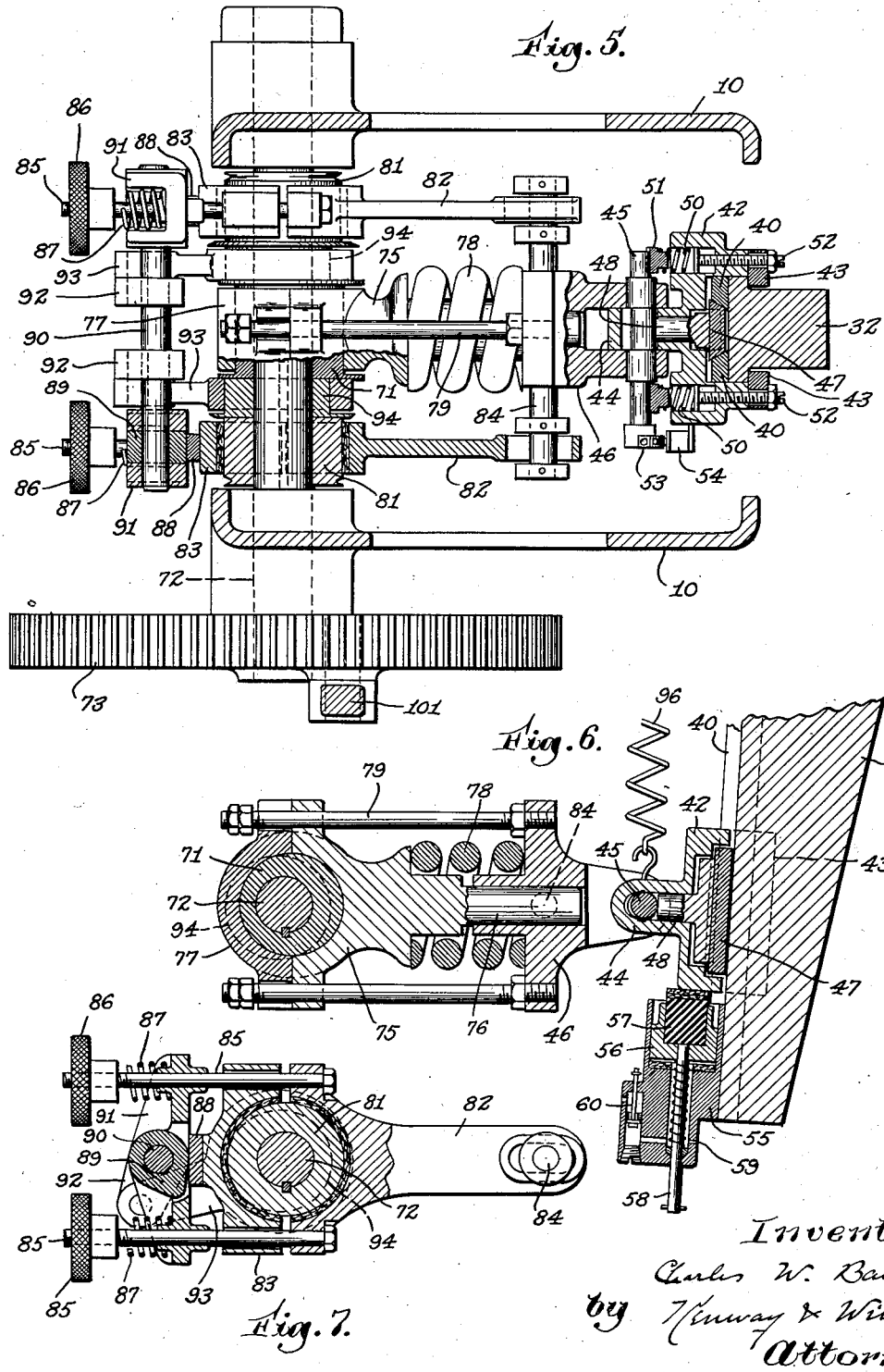

Patented July 21, 1936

2,048,589

UNITED STATES PATENT OFFICE 2,048,589

COUNTER MOLDING MACHINE

Charles W. Bailey, Lynn, Mass., assignor to Stewart Bros., Lynn, Mass., a copartnership composed of John Hammond Stewart and Roland A. Stewart Application May 15, 1934, Serial No. 725,737

22 Claims. (Cl. 12—66)

This invention relates to counter molding machines and consists in improvements in the mold actuating mechanism of such machines designed to increase their efficiency and accuracy of operation and produce a quieter running and longer wearing machine than heretofore known.

In operating counter molding machines, it is the practice to close the cooperating molds upon the curved counter blank, first in a preliminary manner and then under a final heavy molding pressure. These machines are required to operate continuously day in and day out at relatively high speed and under very exacting pressure conditions. The problem of providing mechanism which will operate quietly and powerfully and under satisfactory wearing conditions in counter molding machinery is one which has for many years taxed the ingenuity of inventors and machine designers. The present invention, in one aspect, consists in a solution of this problem and involves novel features of construction useful in counter molding machines of all types.

In another aspect, the invention consists in improvements in the well-known "Stewart Counter Molding Machine" now in wide commercial use. In this type of machine, the actuation of the molds is effected by means of a power actuated member, herein shown as a lever, arranged to be yieldingly moved to preliminary counter engaging or contacting position in each cycle of the machine and then moved from that point to exert the final molding pressure. As herein shown and as a feature of the present invention, mechanism for positioning this member is provided which is designed for accurate adjustment independently of the train of mechanism which operates to exert the molding pressure. In machines heretofore constructed, this member has been both positioned and actuated by the same train of mechanism, with the result that adjustments made for one purpose, as for adequate molding pressure, were sometimes prejudicial to the proper operation of the member in its positioning function. In the mechanism herein shown, all the requisite adjustments may be made independently and with a single purpose in view, thereby contributing materially to the convenience of setting up and maintaining the machine in proper condition and tending to improve its operating conditions at all times.

One satisfactory mechanism for effecting the desired results comprises an eccentric rod or link having an adjustable connection with the mold operating lever, in combination with independently controlled frictionally-operated arms for preliminarily moving the link a variable distance to position it preliminarily and in readiness for its power operation in applying or transmitting the final pressure to the molds. By this arrangement, the link may be constructed, arranged and operated in the manner best suited for its power actuation and pressure-applying function, while the matter of positioning it may be taken care of independently by the frictionally-operated arms.

Other features of the invention reside in novel mechanism for securely locking the eccentric rod or link to the pressure lever at whatever point the connection may occupy at the conclusion of its preliminary movement, together with provision for adjusting the locking mechanism so that its operation may be controlled and timed to a nicety. The machine also includes novel means for limiting the travel of the operating link with respect to the pressure lever and of cushioning its impact in such travel.

These and other features of the invention will be best understood and appreciated from the following description of a preferred embodiment thereof, selected for purposes of illustration and shown in the accompanying drawings, in which Fig. 1 is a view of the machine in side elevation showing a portion of the frame broken away;

Fig. 2 is a fragmentary view of the machine in front elevation;

Fig. 3 is a fragmentary view of part of the mold operating mechanism;

Fig. 4 is a view in side elevation, partly in section, of the measuring and pressure-applying mechanism;

Fig. 5 is a plan view, partly in section, on the broken line 5—5 of Fig. 1;

Fig. 6 is a sectional view of the mechanism shown in Fig. 4; and

Fig. 7 is a view in side elevation, partly in section, of one of the positioning links and associated mechanism.

Figure 1:
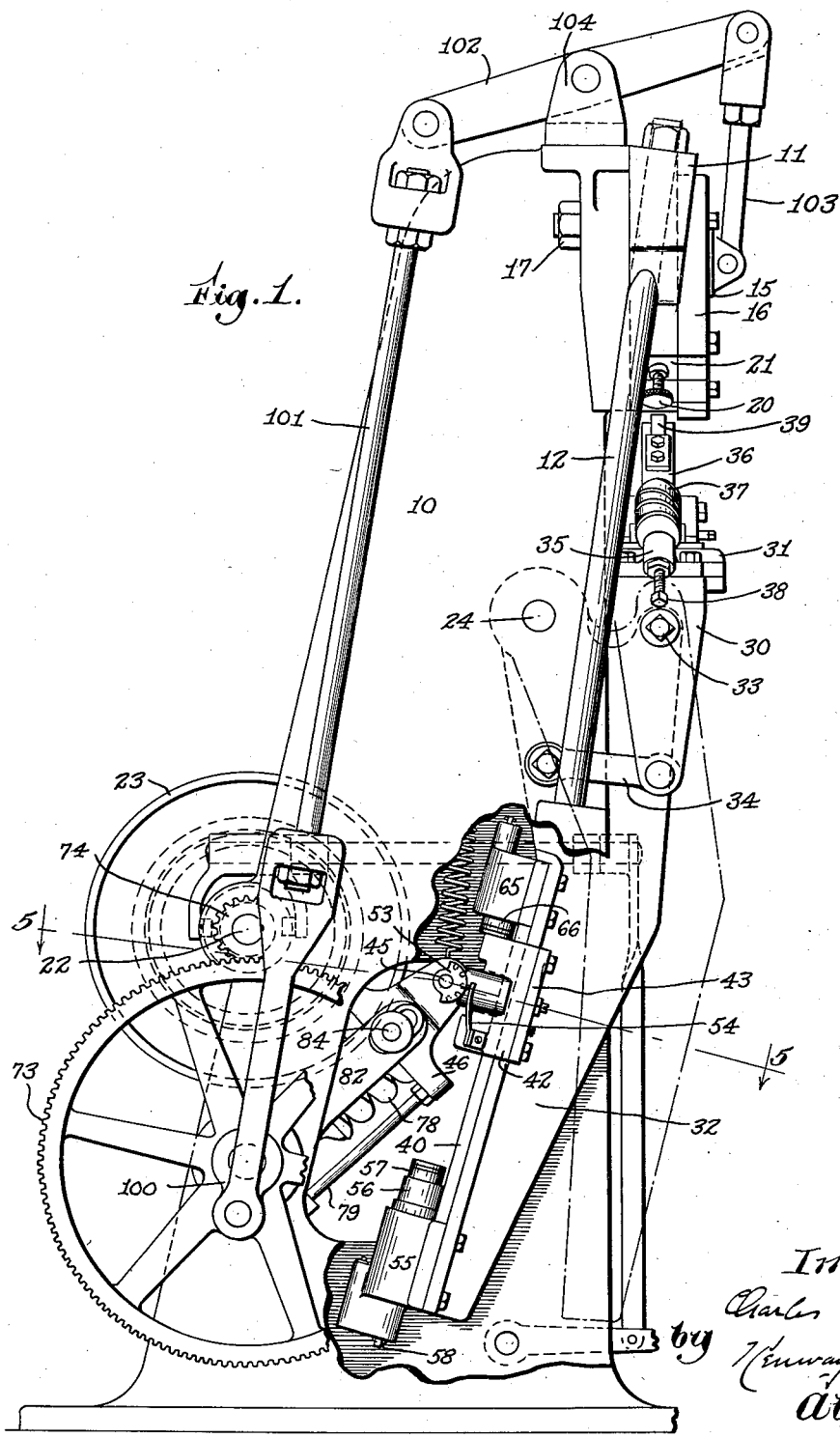

Before proceeding to a detailed description of the machine, it will be convenient first to outline its general construction and manner of operation. Side molds 13 are mounted in the upper part of the machine for limited vertical movement and arranged for opening and closing movement. The male mold or plug 14 is carried by a vertically-movable bed piece 30 mounted on the short arm of a pendant pressure lever 32. This is rocked in two distinct steps to lift the plug and apply preliminary and final molding pressure to the molds by an eccentric-operated rod or link which has a sliding connection with the lever. The link is first swung downwardly from its initial upwardly-inclined position to a substantially horizontal position, and then moved longitudinally by power to impart the final molding pressure to the molds. A flange plate is thereupon operated to form the flange of the counter while the latter is held under molding pressure in the molds. The novel features of the present invention are found particularly in the construction of the link which operates the pressure lever and in the associated mechanism for operating and positioning this link and for connecting it with the pressure lever.

In molding counters, the operator inserts a curved counter blank between the molds 13 and the plug 14. He then starts the machine and the molds are at once closed in a preliminary manner, engaging the counter blank and leaving its margin projecting beyond the plane of the outer faces of the molds 13 and the plug 14. The operator has an opportunity at this stage of adjusting or correcting the position of the counter blank, if necessary, as by centering it, before the final molding operation takes place. When the counter blank is located to his satisfaction, the further action of the machine is to bring the molds 13 further together under heavy molding pressure, and just before this stage is reached the flange plate 15 is moved downwardly, wiping inwardly the projecting margin of the counter blank and molding it upon the face of the plug 14 to form the flange of the molded counter.

Passing now to a consideration of the construction of the machine, it will be found to have an upright frame 10, which includes spaced side members joined by a base plate. A heavy cross plate 11 is secured to the upper portion of the frame by bolts 17 and this is tied to the lower portion of the frame by a pair of tie rods 12 which extend through the plate 11 and through lugs or ears projecting outwardly from the side walls of the frame 10. The reciprocatory flange plate 15 is arranged to travel vertically in ways 16 secured to the face of the cross plate 11. The frame is provided with bearings for a driving shaft 22, carrying a pulley 23, and with bearings for a transverse shaft or journal 24, from which the main pressure-applying lever of the machine is suspended, all as will be presently described.

The molds 13 are suspended in the machine between a pair of inclined toggle links 18 and a pin 25. The links have cylindrical ends which fit into corresponding sockets formed in eccentric bushings 19 in the cross plate 11 and in the molds 13 respectively. The pin 25 projects forwardly from and is carried by a cross head 26 arranged to slide vertically within the machine frame. The cross head is frictionally mounted upon a vertically-extending offset bar 27 fast at its lower end to the vertically-movable bed piece 30. Each of the links 18 is engaged by the upper end of an oblique adjusting screw 20 which is threaded into a block 21 fast to the cross plate 11. A compression spring encircles the upper end of each adjusting screw 20. By turning the adjusting screws 20, the molds 13 may be centered about the pin 25 as an axis and thus adjusted with reference to the plug 14. When the bed piece 30 is elevated, early in the cycle of the machine and the pin 25 carried upwardly, the two molds 13 are swung inwardly and bring about the preliminary engagement of the counter blank already described. During the completion of the cycle of the machine, in which the bed plate 30 is further lifted, the bar 27 slides frictionally through the cross head 26, thus maintaining the molds 13 in closed position.

The plug 14 is removably supported on a base 31 which fits into ways bolted to the upper face of the bed piece 30. The bed piece 30, as shown in Figs. 1 and 2, has the shape of an inverted U and is pivotally supported upon the upper end of the pressure lever 32 by a cross pin 33. Its lower arms are each connected to the machine frame by links 34 and the links are substanially equal in length to the distance of the cross pin 33 from the shaft 24 which constitutes the axis of the pressure lever 32 so that, in effect, the bed piece is part of a parallel linkage assembly and is moved up or down in a substantially vertical path when the pressure lever 32 is rocked.

To the upper face of the bed piece 30 is bolted a pair of brackets 35, upon each of which is mounted an oblique plunger 36 backed up by a heavy compression spring 37 and an adjusting screw 38. Each plunger carries at an upper end a contact piece 39 which, when the bed piece is elevated, is arranged to engage an oblique surface at the lower end of one of the molds 13. In the stopped position of the machine, the contact pieces 39 are spaced from the corresponding faces of the molds 13 and in no way affect the preliminary closing action thereof. It is only after the bed piece 30 has been lifted sufficiently to take up this lost motion that the final molding pressure is imparted to the molds 13 through the medium of the plungers 36.

The mechanism for raising and lowering the bed piece 30 will now be explained. The pressure lever 32, upon which it is carried, is, as already stated, suspended from the transverse shaft 24 which extends between the sides of the frame. The lever is roughly triangular in shape and supports the bed piece 30 with a short arm, whereas the power of the machine is applied to the lever at its lower end and through a long arm. The pressure lever 32 is flanged in its lower portion to form a guideway and upon its rear face is provided with spaced parallel ways 40 having diverging opposed inner edges. A carriage 42 is arranged to slide freely and longitudinally upon the guideway of the pressure lever 32 and to embrace the ways 40. The carriage 42 straddles the pressure lever 32 and is provided with guide strips 43 which run beneath its flange. The carriage is also provided with a short slotted arm 44 through which passes a transverse shaft 45, serving to connect the carriage to the forked head 46 of a pressure link, to be presently described.

Mounted within the carriage 42 is a brake shoe 47 having converging side walls which cooperate with the diverging edges of the ways 40 in locking the carriage in place upon the lever 32 when the brake shoe is forced inwardly toward the lever. The brake shoe is provided with an outwardly-extending pin or stem 48 which engages the center portion of the cross shaft 45 and the latter is formed eccentrically with respect to its own journal portions which are mounted in the forked head 46 of the pressure link. At either side the carriage 42 is provided with bores in which are placed compression springs 50 each engaging at its outer end a contact piece 51 which is forced against one end of the transverse shaft 45. At its inner end each of the springs rests upon an adjusting screw 52 threaded into the carriage 42 and serving to regulate the compression of the spring. The two springs 50 thus tend at all times to separate the carriage 42 from the head 46 of the pressure link, thus freeing the end of the pin 48 from engagement by the shaft 45 and releasing the brake shoe in the ways 40 so that the carriage 42 is free to move longitudinally upon the pressure lever 32. At one end the shaft 45 is provided with a perforated segment 53 and this cooperates with a locking pin carried by a leaf spring 54 fast to one side of the carriage 43. The braking effect of the brake shoe 47 may thus be adjusted by retracting the locking pin against the tension of the spring 54 and turning the shaft 45 to regulate its effective eccentricity with reference to the pin 48.

The position of the travel of the carriage 42 upon the lever 32 is limited at either end of its stroke by suitable dashpot mechanism. The lower of these, as shown in Fig. 6, comprises a cylindrical housing 55 which is rigidly secured to the lower end of the lever 32 and provided with a piston 56 carrying a yielding cushion member 57 which projects above the open end of the cylinder. The piston 56 is provided with a rod 58 which projects out through the lower end of the housing 55 and encircling this is a compression spring which tends at all times to maintain the piston in its outward or upper position, as shown in Fig. 1. The housing is provided with a small bleeder passage 59 which communicates with the interior of the cylinder and with a regulating valve 60, and the dashpot operates to limit the downward travel of the carriage 42 upon the lever 32 and cushion its impact. A similar housing 65, provided with a piston 66 and cushion 67, provides similar dashpot mechanism secured to the pressure lever 32 at the upper end of its guideway for the carriage 42.

The pressure link as a whole is mounted upon an eccentric 71 formed on a transverse power-driven shaft 72 midway between the side walls of the frame 10, and is not only operated by the eccentric but is free to swing angularly about it. The shaft 72 is journaled in the machine frame and carries at its outer end a large gear wheel 73 by which it is driven through a pinion 74 on the driving shaft 22.

The link, as shown in Fig. 6, comprises the forked head 46, already mentioned, an inner portion 75 terminating in a stud 76 which makes a sliding fit in a bore in the head 46, and a cap portion 77 encircling the outer part of the eccentric 72. The inner portion is shouldered to provide a seat for a heavy compression spring 78 interposed between it and the inner face of the head 46, and all three parts are tied together by parallel tie rods 79 threaded into the head 46 and projecting loosely through the cap 77, thereby permitting slight compression of the spring 78 under conditions of excessive pressure. The eccentric 71 is timed to impart a thrust to the pressure link when the latter has been moved angularly from its initial upwardly-inclined position, as shown in Fig. 4, into its substantially horizontal position and approximately at right angles to the lever, as shown in Fig. 6. In the working stroke of the eccentric, the springs 50 are compressed and the brake shoe 47 driven into locking position by the transverse shaft 45 so that the carriage 42 is locked in position upon the pressure lever 32.

A pair of friction collars 81, Fig. 5, are keyed to the power shaft 72 inside the walls of the machine frame 10 and a friction arm 82 is mounted on each collar. Each friction arm is adjustably secured to a cap member 83 by means of tie bolts 85 and the inner faces of both the friction arm 82 and the cap member 83 are lined with brake band material. The outer end of each of the friction arms 82 is slotted to receive cross pins 84 which project outwardly from the sides of the head 46 of the pressure link. The two tie rods 85 of each arm are extended rearwardly to receive a bar 91 provided with a lug having bearings for a transverse cam shaft 90 which is thus mounted transversely upon the two friction arm assemblies in parallel relation to and behind the power shaft 72. At its outer end each tie rod 85 is provided with a knurled nut 86 and between these nuts and the bar 91 are interposed compression springs 87, the tension of which may be regulated by turning the knurled nuts 86. Upon the shaft 90 are secured two cams 89, one arranged in alignment with each of the friction arms and arranged to bear upon a hardened contact piece 88 secured to the cap 83. The springs are normally under light compression so that there is little or no frictional engagement between the friction arms and the friction collars 81. Fast to the shaft 90 are two downwardly-extending arms 92 and each of these is connected to an eccentric link 93 which surrounds an eccentric 94 keyed to the shaft 72, one at each side of the eccentric 71 and located inside the friction collars 81. The timing of the eccentrics 94 is such that when the machine is started the cam shaft 90 is immediately rocked through the links 93 to swing the cams 89 in a counter clockwise direction, as seen in Fig. 7, placing the springs 87 under compression and binding the two parts of the friction arms to the friction collars 81. When this occurs, the two friction arms 82 are rocked in a clockwise direction and, through the cross pins 84, the pressure link is swung downwardly toward the position shown in Fig. 6. The carriage 42 is fast to the lower end of a long tension spring 96 and this, when permitted to do so, maintains the carriage at the upper end of its stroke in contact with the dash-pot cushion 67 and with the pressure link in its upwardly-inclined position. The downward swinging movement of the pressure link caused by the friction arms takes place in opposition to the spring 96.

Attention is called to the balanced design of the pressure link mechanism and associated parts. The link and its operating eccentric 71 are centrally disposed between the walls of the machine frame. The cam operating eccentrics 94 come next on either side of the power eccentric 71 and operate at spaced points upon the cam shaft 90 without any tendency toward cramping or twisting. Outside the cam eccentrics are located the friction collars 81 and the friction arms 82 are symmetrically arranged on opposite sides of the power link so that their motion is transmitted to the link evenly and also without tendency to twist or cramp. Moreover, each of the friction arms may be adjusted independently so that the amount of operating friction in both cases may be equalized and their action is, of course, entirely independent of the power operation of the pressure link. As shown in Fig. 6, the pressure link has been moved to a position in which the carriage 42 encounters the lower dashpot cushion and this is a condition that occurs when the machine is turned over with no counter blank in the molds or with a counter blank of minimum thickness. If a thick counter blank has been inserted in the molds or, as sometimes occurs, two overlapping counter blanks have been inserted, the carriage 42 will be arrested at a point somewhat above that shown in Fig. 6 and under these circumstances the path of movement of the pressure lever 32 will not extend forwardly quite to the position which it would reach under the conditions suggested in Fig. 6.

The timing of the eccentrics 94 and the design of the cam 89 is such as to bring about the frictional engagement of the arms 82 with their actuating collars 81 early in the cycle of the machine and to maintain such engagement until the swinging movement of the arms is completed. Thereupon the brake shoe 47 is operated to lock the carriage 43 to the lever 32 and the angular position of the link and also of the arms 82 is momentarily fixed while the final molding pressure occurs. At this time, or slightly prior thereto, the eccentrics 94 act to move the cam 89 in a reverse direction completely to release the frictional engagement of the arms 82 from their collars, thus leaving the arms free to swing reversely under the tension of the spring 96 to initial position as determined by the upper of the two dashpots 65.

The flange plate 15, which has already been described as moving in ways 16 upon the cross plate 11, is operated from a crank 100 fast to the outer end of the power shaft 72 and connected to a substantially vertical crank rod 101. At its upper end the rod 101 is connected to the rear arm of a rocker member 102 journaled in a bracket 104 fast to the top of the machine frame. The forward arm of the rocker member 102 is connected to the flange plate by means of a vertical link 103 and, as already explained, the timing of the machine is such as to move the flange plate downwardly just prior to the final lift of the bed piece 30 in which the final pressure is imparted to the molds.

Having thus described my invention, what I claim as new and desire to secure by Letters Patent is:

1. A counter molding machine having, in combination, cooperating counter molds mounted for relative molding movement, and actuating mechanism therefor including a pressure lever, a power-driven shaft, and a power-transmitting connection therebetween, said shaft having separate means first to position said connection on the lever and then to move it bodily in swinging the lever.

2. A counter molding machine having, in combination, cooperating counter molds mounted for relative molding movement in consecutive steps, and actuating mechanism therefor including a pressure lever, a power-driven shaft having an eccentric thereon, a link operated by the eccentric and having a sliding connection with the lever, and power operated means, separate from said eccentric, for shifting the point of connection of said link with the pressure lever to effect a preliminary closing of the molds.

3. A counter molding machine having, in combination, cooperating counter molds mounted for relative molding movement, and actuating mechanism therefor including a pressure lever, a power-driven shaft having an eccentric and a friction surface therein, a link operated by the eccentric and having a sliding connection with the lever, and an arm operated by said shaft through its friction surface for swinging the link to a variable point of connection with the lever depending upon the thickness of the material interposed between the molds.

4. In a counter molding machine, mold actuating mechanism including a movable pressure lever, a power-driven shaft, a link operated by the shaft and having a sliding connection with the lever, and a pair of arms mounted on the shaft at either side of the link, having adjustable operating relation to the shaft and connected to the outer end of the link to swing the same preliminarily to its power operation.

5. In a counter molding machine, mold actuating mechanism including a movable pressure lever, a power-driven shaft, a link operated by the shaft and having a sliding connection with the lever, an arm operatively connected to the shaft and communicating with the outer end of the link for swinging the link to vary its point of connection with the lever, and means for automatically controlling the connection between the shaft and said arm.

6. In a counter molding machine, mold actuating mechanism including an oscillatory pressure lever suspended in substantially vertical position, a carriage movable thereon, a power-driven shaft, a link operated by the shaft and connected to said carriage, means for lifting the carriage, means distinct from the link for moving the carriage downwardly on the lever, and dashpot mechanism on the lever for limiting the travel of the carriage and cushioning its impact.

7. In a counter molding machine, mold actuating mechanism including an oscillatory pressure lever suspended in substantially vertical position, a power-driven shaft, a link operated by the shaft and normally connected to the lever in an upwardly-inclined position, and mechanism acting upon the outer end of the link for swinging it downwardly into a position approximately at right angles to the lever prior to the application of final molding pressure.

8. In a counter molding machine, mold actuating mechanism including an oscillatory pressure lever, a power-driven shaft, a link operated by the shaft and having a sliding connection with said lever, spring means for initially holding the link in position to retract the lever, and independently adjustable power-operated mechanism for engaging the outer end of the link and swinging it against spring tension to move the lever into a position of preliminary pressure.

9. In a counter molding machine, mold actuating mechanism including an oscillatory pressure lever, a power-driven shaft having an eccentric and friction members aranged at each side of the eccentric, a link operated by the eccentric and having sliding connection with the lever, spaced arms mounted on said friction members and connected at their outer ends to said link, and means for automatically establishing and releasing operating connection between said arms and their respective friction members to control the angular position of the link and its point of connection with said lever.

10. In a counter molding machine, mold actuating mechanism including an oscillatory pressure lever, a power shaft, a link operated thereby and having sliding connection with the lever, arms mounted on the shaft for controlling the angular position of the link and each provided with a friction cap, and means on said shaft operating automatically to contract or release said arms and caps in different parts of the machine cycle.

11. In a counter molding machine, mold actuating mechanism including an oscillatory pressure lever, a power shaft having an intermediate eccentric, and a supplementary eccentric and a friction member on both sides thereof, a link operated by the intermediate eccentric and having sliding connection with the lever, arms mounted to said friction members and connected at their outer ends to said link, a rock shaft operated by said supplementary eccentrics, and means operated by the rock shaft for releasing said arms with respect to their friction members at a predetermined point in the cycle of the machine.

12. In a counter molding machine, mold actuating mechanism including a pressure lever, a power shaft, a link operated by the shaft and having a sliding connection with said lever, means for preliminarily swinging the link to shift its connection with the lever to a point corresponding to the thickness of the material in the molds, and adjustable means for locking the link to the lever in such position arranged to be automatically operated.

13. In a counter molding machine, mold actuating mechanism including a pressure lever, a power shaft, a link operated by the shaft and having a sliding connection with said lever, and adjustable means for locking the link to the lever in a position determined by the thickness of the material in the molds automatically brought into action by the pressure-applying movement of said link.

14. In a counter molding machine, mold actuating mechanism including a pressure lever, a power shaft, a link operated by the shaft and having a sliding connection with said lever and a compressible section in its length, and arms having a pin and slot connection with the outer end of said link and operating to control its point of connection with said lever.

15. In a counter molding machine, mold actuating mechanism including a pressure lever having a substantially vertically-disposed guideway therein, a carriage movable upon the guideway in swinging the lever, an operating link connected to the carriage, and a dashpot carried by the lever to limit the travel of the carriage thereon and to cushion its impact.

16. In a counter molding machine, mold actuating mechanism including a pressure lever having a guideway therein, a carriage movable upon the guideway in swinging the lever and having a brake shoe therein, and an operating link connected to the carriage and provided with adjustable means for operating the brake shoe of the carriage to fix temporarily its point of connection with the pressure lever.

17. In a counter molding machine, mold actuating mechanism including a pressure lever, a power driven shaft, an operating train of mechanism between said shaft and lever for transmitting pressure from the shaft to the lever and including an eccentric on said shaft, and a second train of mechanism operated by the shaft for setting the first in pressure-applying position and having adjusting mechanism of its own.

18. In a counter molding machine, mold actuating mechanism including a pressure lever, a power driven shaft, an eccentric-operated assembly arranged to swing upon said shaft and having connection with said lever for moving it in successive steps, friction-operated arms and a cam shaft mounted in the swinging assembly, and cam-operated means arranged to be operated by said cam shaft for causing said arms to engage.

19. A counter molding machine having, in combination, mold actuating mechanism including a pressure lever, a power shaft, an operating link and a link-positioning arm both mounted for angular movement about the shaft, and friction means for swinging said arm arranged automatically to release the arm for free movement after it has positioned the link.

20. A counter molding machine having, in combination, mold actuating mechanism including a pressure lever, a power shaft, an operating link and a link-positioning arm both mounted for angular movement about the shaft, means for clutching the link to the lever in position for applying pressure thereto, and friction means for swinging said arm arranged automatically to release the arm after the clutching means has acted.

21. A counter molding machine having cooperating molds, and actuating mechanism including a power driven shaft, an operating link and a pressure lever associated with said molds and having a movable connection with the operating link, mechanism for automatically shifting the connection between said operating link and pressure lever to effect a preliminary engagement of the molds with a counter blank, and means for thereupon locking said connection in place and rendering the automatic shifting mechanism temporarily ineffective.

22. A counter molding machine having cooperating mold members, actuating mechanism therefor including a pressure lever, a power shaft, a connecting member operated by the shaft and having a sliding connection with said lever, means for preliminarily moving the connection until arrested by the preliminary engagement of the molds with a counter blank, and means for locking the connecting member to the lever in position corresponding to such preliminary engagement, said means acting automatically to unlock the connection during the reverse movement of the pressure lever.

CHARLES W. BAILEY.